US012580863B2

(12) United States Patent
Kuravangi-Thammaiah et al.

(10) Patent No.: US 12,580,863 B2
(45) Date of Patent: Mar. 17, 2026

(54) SYSTEMS AND METHODS FOR PROVIDING ANALYTICS FROM A NETWORK DATA ANALYTICS FUNCTION BASED ON NETWORK POLICIES

(71) Applicant: Verizon Patent and Licensing Inc., Basking Ridge, NJ (US)

(72) Inventors: Shanthala Kuravangi-Thammaiah, Keller, TX (US); Rishi Tandon, Gurugram (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 98 days.

(21) Appl. No.: 18/487,892

(22) Filed: Oct. 16, 2023

(65) Prior Publication Data

US 2025/0126065 A1 Apr. 17, 2025

(51) Int. Cl.
*H04L 47/125* (2022.01)
*H04L 43/065* (2022.01)
*H04L 47/2425* (2022.01)

(52) U.S. Cl.
CPC .......... *H04L 47/125* (2013.01); *H04L 43/065* (2013.01); *H04L 47/2425* (2013.01)

(58) Field of Classification Search
CPC .. H04L 47/125; H04L 43/065; H04L 47/2425
See application file for complete search history.

(56) References Cited

U.S. PATENT DOCUMENTS

2023/0062930 A1* 3/2023 Puente Pestaña ..... H04W 24/08
2023/0075951 A1* 3/2023 Long ........................ H04L 69/40

2023/0145512 A1* 5/2023 Park ...................... H04W 24/08
709/227
2023/0147409 A1* 5/2023 Park ........................ H04L 12/56
370/329
2024/0073709 A1* 2/2024 Karampatsis ......... H04W 24/02
2024/0373291 A1* 11/2024 So ........................ H04L 41/0894
2025/0175247 A1* 5/2025 Pan .................... H04B 7/18545

OTHER PUBLICATIONS

"SG•Architecture enhancemen't s for 5G System (SGS) to support network data analytics services (3GPP TS 23.288 version 16.4.0 Release 16)," ETSI TS 123 288 V16.4.0, Jul. 2020, 68 Pages.
"5G; Procedures for the 5G System (5GS) (3GPP TS 23.502 version 16.7.0 Release 16)," ETSI TS 123 502 V16.7.0, Jan. 2021, 607 Pages.
"5G; 5G System; Unified Data Management Services; Stage 3 (3GPP TS 29.503 version 16.4.0 Release 16)," ETSI TS 129 503 V16.4.0, Jul. 2020, 363 Pages.

* cited by examiner

*Primary Examiner* — Chris Parry
*Assistant Examiner* — Steven C Nguyen

(57) ABSTRACT

A network device may establish an interface with a unified data management (UDM) device, and may utilize the interface to register with the UDM device and to provide, to the UDM device, registration data identifying an association between the network device and a user equipment (UE). The network device may provide policy data to a network data analytics function (NWDAF) that identifies the network device based on the registration data, and may receive, from the NWDAF, analytics calculated based on the policy data. The network device may perform one or more actions based on the analytics.

20 Claims, 6 Drawing Sheets

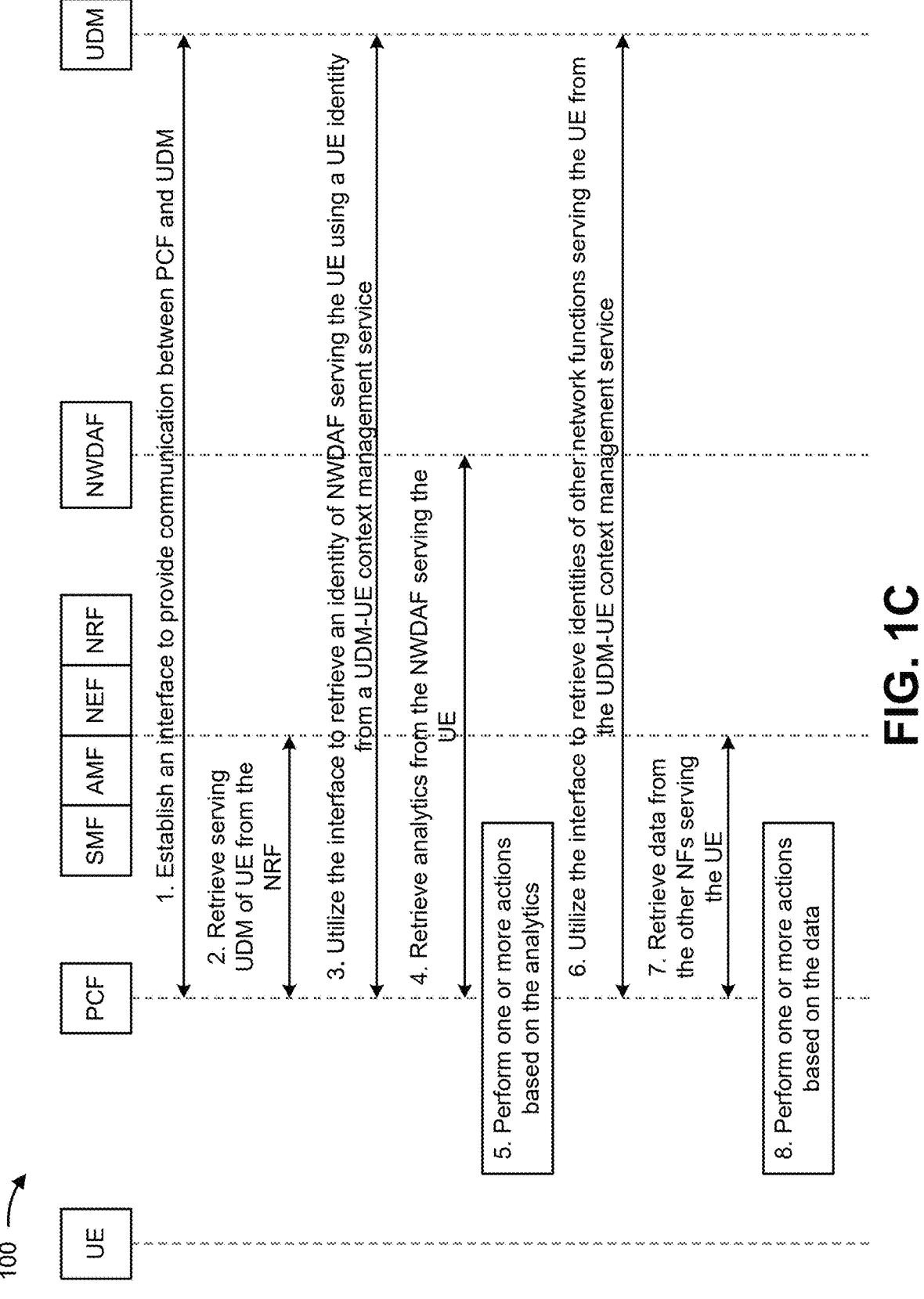

UDM

NWDAF

SMF | AMF | NEF | NRF

PCF

UE

1. Establish an interface to provide communication between PCF and UDM

2. Retrieve serving UDM of UE from the NRF

3. Utilize the interface to retrieve an identity of NWDAF serving the UE using a UE identity from a UDM-UE context management service 4. Retrieve analytics from the NWDAF serving the UE 5. Perform one or more actions based on the analytics 6. Utilize the interface to retrieve identities of other network functions serving the UE from the UDM-UE context management service 7. Retrieve data from the other NFs serving the UE 8. Perform one or more actions based on the data

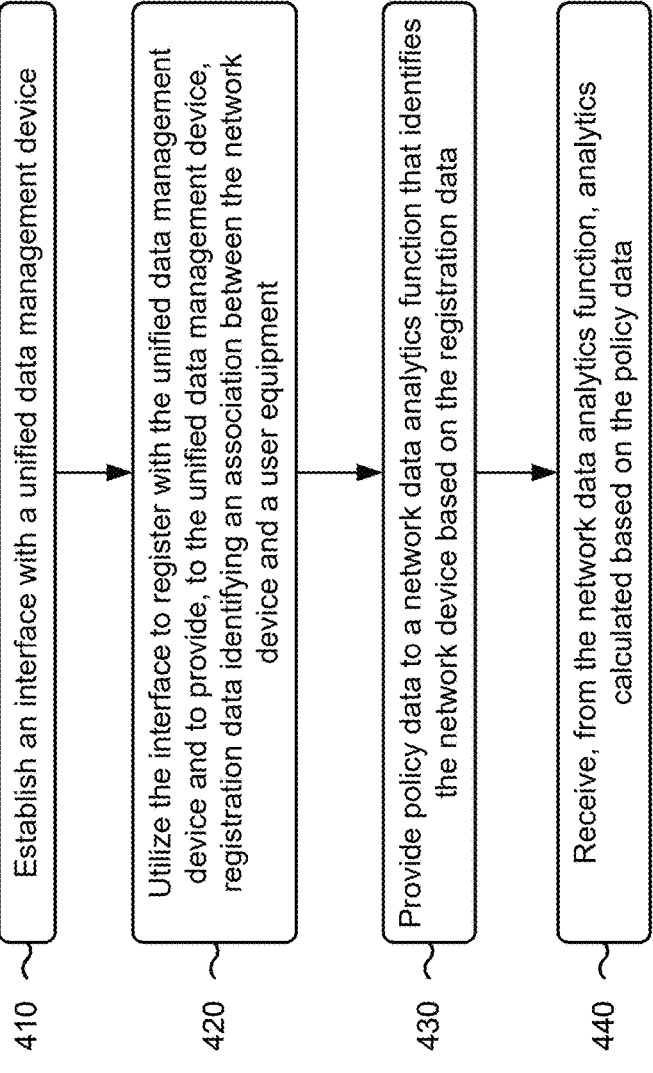

410 — Establish an interface with a unified data management device

420 — Utilize the interface to register with the unified data management device and to provide, to the unified data management device, registration data identifying an association between the network device and a user equipment 430 — Provide policy data to a network data analytics function that identifies the network device based on the registration data 440 — Receive, from the network data analytics function, analytics calculated based on the policy data

SYSTEMS AND METHODS FOR PROVIDING ANALYTICS FROM A NETWORK DATA ANALYTICS FUNCTION BASED ON NETWORK POLICIES

BACKGROUND

A network data analytics function (NWDAF) is designed to streamline the way a core network data is produced and consumed, as well as to generate insights and take actions to enhance an end-user experience.

BRIEF DESCRIPTION OF THE DRAWINGS

FIGS. 1A-1C are diagrams of an example associated with providing analytics from an NWDAF based on network policies.

FIG. 4 is a flowchart of an example process for providing analytics from an NWDAF based on network policies.

DETAILED DESCRIPTION OF EXAMPLE EMBODIMENTS

Figure 1A:
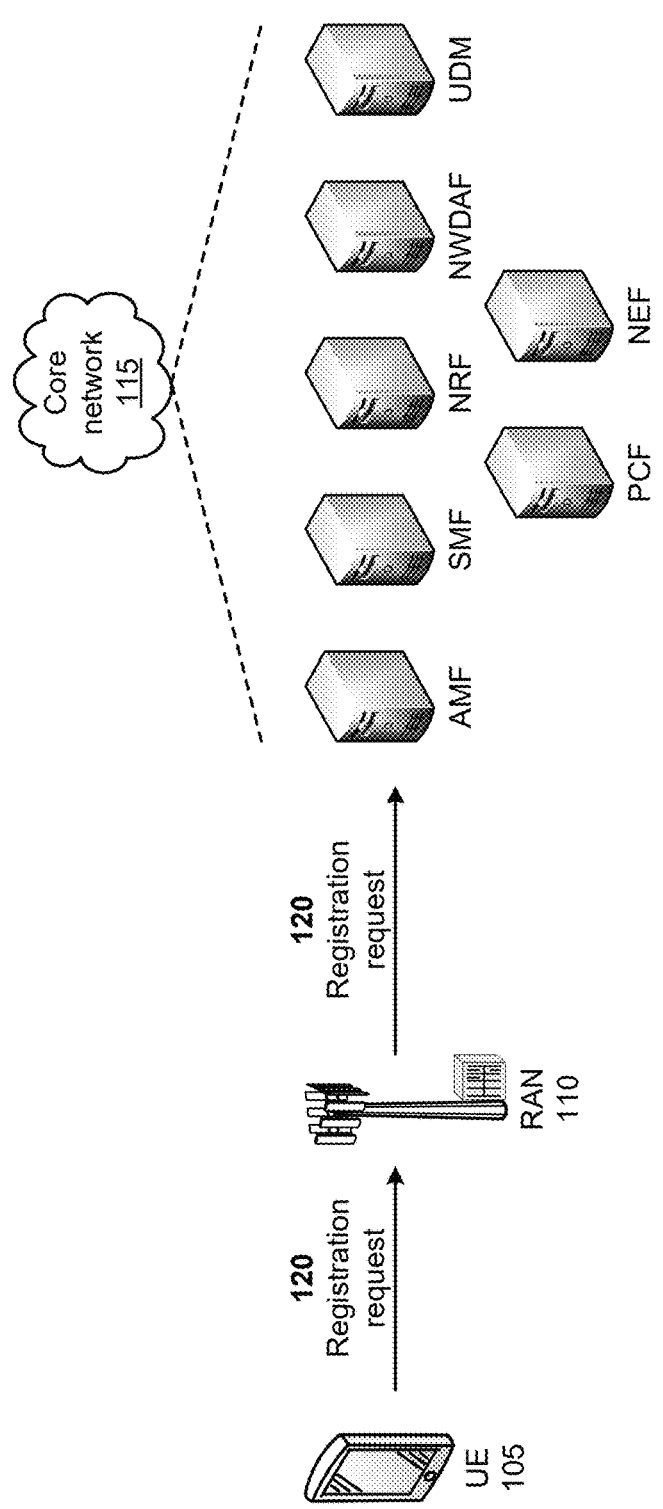

The following detailed description of example implementations refers to the accompanying drawings. The same reference numbers in different drawings may identify the same or similar elements.

Per the Third Generation Partnership Project (3GPP), a policy control function (PCF) may request NWDAF analytics, such as a service experience, a network performance, and/or the like. The PCF learns which NWDAF is being used by an access and mobility management function (AMF), a session management function (SMF), and a user plane function (UPF) for a specific user equipment (UE). This enables the PCF to select the same NWDAF that is being used for the specific UE. However, there is no direct communication between the PCF and a unified data management (UDM) device for NWDAF registration and selection. In a segmented network, any UE can be associated with any PCF. Thus, a PCF will not be able provide an identifier (e.g., a subscription permanent identifier (SUPI) range) associated with the PCF in a network function (NF) profile during registration of the PCF with a network repository function (NRF). This makes it impossible for the NWDAF to directly discover the PCF with a policy association for a particular UE. The 3GPP provides option for the PCF to retrieve NWDAF information via an AMF and an SMF associated with a specific UE in the control plane. However, such an option is inefficient and incomplete.

Thus, current network configurations consume computing resources (e.g., processing resources, memory resources, communication resources, and/or the like), networking resources, and/or other resources associated with failing to identify a PCF supporting a specific UE, failing to provide analytics associated with the PCF and a specific UE to the PCF, failing to utilize the analytics associated with the PCF and the specific UE, failing to perform actions based on the analytics associated with the PCF and the specific UE, and/or the like.

Some implementations described herein provide a network device that provides analytics from an NWDAF based on network policies. For example, a network device (e.g., a PCF) may establish an interface with a UDM device, and may utilize the interface to register with the UDM device and to provide, to the UDM device, registration data identifying an association between the network device and a UE. The network device may provide policy data to an NWDAF that identifies the network device based on the registration data, and may receive, from the NWDAF, analytics calculated based on the policy data. The network device may perform one or more actions based on the analytics.

In this way, the network device (e.g., a PCF) provides analytics from an NWDAF based on network policies. For example, the network device may be provided with a new interface for communication between the network device and a UDM. The network device may receive an identity of the UDM from an NRF, and may utilize the new interface to retrieve an identity of an NWDAF associated with a UE using a UE identity from a UDM-UE context management service. The network device may utilize the new interface to provide a PCF-to-UE context association to the UDM and to register with the UDM after a successful session management (SM)/UE/access and mobility (AM) policy association. The UDM may support an additional registration data set in the UE context management service to accommodate PCF registration data identifying the PCF associated with the UE, and the NWDAF may retrieve the PCF registration data from UDM in order to identify the PCF serving the UE. Thus, the network device may conserve computing resources, networking resources, and/or other resources that would have otherwise been consumed by failing to identify a PCF supporting a specific UE, failing to provide analytics associated with the PCF and a specific UE to the PCF, failing to utilize the analytics associated with the PCF and the specific UE, failing to perform actions based on the analytics associated with the PCF and the specific UE, and/or the like.

Figure 1B:
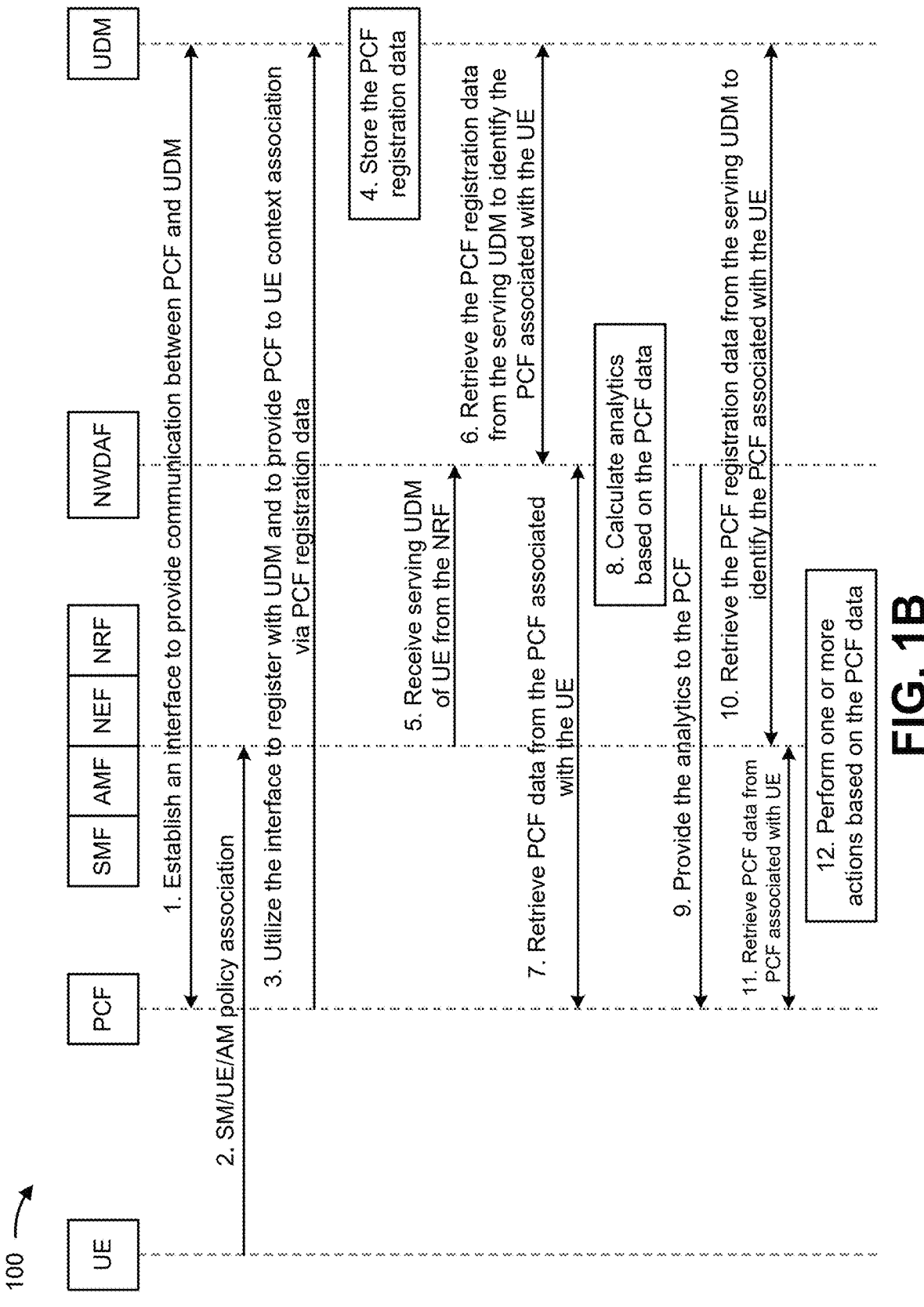

FIGS. 1A-1C are diagrams of an example 100 associated with providing analytics from an NWDAF based on network policies. As shown in FIGS. 1A-1C, example 100 includes a UE 105, a radio access network (RAN) 110, and a core network 115 that includes an AMF, an SMF, an NRF, an NWDAF, a UDM device, a PCF, and a network exposure function (NEF). Further details of the UE 105, the RAN 110, the core network 115, the AMF, the SMF, the NRF, the NWDAF, the UDM device, the PCF, and the NEF are provided elsewhere herein.

As shown in FIG. 1A, and by reference number 120, the UE 105 may provide a registration request (e.g., a protocol data unit (PDU) session establishment request) to the RAN 110, and the RAN 110 may provide the registration request to the core network 115. For example, the UE 105 may attempt to establish a PDU session with the core network 115, via the RAN 110, in order to communicate with other UEs 105, an application server, a cloud computing environment, and/or the like. In order to establish the PDU session, the UE 105 may generate the registration request that requests establishment of the PDU session with the RAN 110 and the core network 115. The registration request may also include credentials of a user of the UE 105, an identifier of the UE 105, and/or the like. The UE 105 may provide the registration request to the RAN 110, and the RAN 110 may forward the registration request to the core network 115. The core network 115 may receive the registration request from the RAN 110.

FIGS. 1B and 1C are call flow diagrams depicting steps associated with providing analytics from an NWDAF based on network policies. As shown at step 1 of FIG. 1B, the PCF may establish an interface with the UDM device in order to communicate with the UDM device. For example, the interface may enable the PCF and the UDM device to communicate and to exchange information. As shown at step 2, the UE 105 may be successfully associated with the SMF and the AMF. For example, the UE 105 may establish an SM policy association with the SMF, and may establish an AM policy association with the AMF. Thus, the UE 105 may establish a successful SM/UE/AM policy association.

As shown at step 3 of FIG. 1B, the PCF may utilize the interface to register with the UDM device and to provide a PCF to UE context association via PCF registration data. For example, the UDM device may be modified to support additional registration data, set in a UE context management service, to accommodate PCF registration data associated with the PCF. The PCF may be modified to register with the UDM device (e.g., per a SUPI allocated to the UE 105 and/or per a data network name (DNN)) upon successful PDU session establishment by the UE 105. The PCF registration data may include data indicating that the PCF is serving the UE 105 (e.g., the PCF to UE context association). As shown at step 4, the UDM device may store the PCF registration data as part of the UE context management service of the UDM device. The PCF may receive, from the UDM device, an indication that the PCF registration data is created in the UDM device. As shown at step 5, the NWDAF may receive and identification of the serving UDM device of the UE 105 from the NRF. For example, the NWDAF may provide, to the NRF, a request for identification of the serving UDM device for the UE 105. The NRF may provide, to the NWDAF, the identification of the serving UDM device for the UE 105 based on the request.

As shown at step 6 of FIG. 1B, the NWDAF may retrieve the PCF registration data from the serving UDM device. The PCF registration data may include data identifying the PCF associated with the UE 105. For example, the NWDAF may provide, to the UDM device, a request for the PCF registration data for the UE 105. The NWDAF may be modified to retrieve, from the UDM device, the PCF registration data associated with the UE 105. The NWDAF may receive, from the UDM device, the PCF registration data associated with the UE 105 based on the request for the PCF registration data. For example, the UDM device may provide, based on the request and to the NWDAF, the PCF registration data associated with the UE 105. As shown at step 7, the NWDAF may retrieve PCF data from the PCF associated with the UE 105. For example, the NWDAF may provide, to the PCF, a request for the PCF data. The NWDAF may receive, from the PCF, the PCF data associated with the UE 105 based on the request for the PCF data. In some implementations, the PCF data may include policy rules for application and service data flow detection, gating, quality of service (QoS), and flow-based charging associated with the UE 105.

As shown at step 8, the NWDAF may calculate analytics based on the PCF data. In some implementations, the NWDAF may calculate UE communications analytics based on the PCF data. The UE communications analytics may include analytics associated with UE communication and user plane traffic patterns for the UE 105 over a period of time. The UE communications analytics may be calculated based on information provided by an NWDAF analytics consumer (e.g., a UE identifier (ID), a UE group ID, and/or the like) and information provided by the UPF (e.g., an uplink data rate, a downlink data rate, a traffic volume, and/or the like). In some implementations, the NWDAF may calculate UE mobility analytics based on the PCF data. The UE mobility analytics may identify a location of the UE 105 over a period of time. The UE mobility analytics may be calculated based on information provided by the NWDAF (e.g., a UE ID, a UE group ID, and/or the like) and based on NWDAF analytics (e.g., a UE ID, a UE group ID, a time slot entry, a ratio of a percentage of UEs in a group, and/or the like). In some implementations, the NWDAF may calculate UE abnormal behavior analytics based on the PCF data. The UE abnormal behavior analytics may provide analytics about abnormal behavior of the UE 105 (e.g., a denial of service attack, frequent registration, misuse, unexpected radio link failures, a hijacking, and/or the like) over a period of time. The UE abnormal behavior analytics may be calculated based on information provided by an NWDAF analytics consumer (e.g., a UE ID, a UE group ID, and/or the like) and based on NWDAF analytics (e.g., exceptions, a UE ID, a UE group ID, a ratio of a percentage of UEs affected, a number of unaffected UEs, and/or the like).

In some implementations, the NWDAF may calculate observed service experience analytics based on the PCF data. The observed service experience analytics may be provided for a network slice, an application, and/or an edge application over an uplink path and/or application over the RAN 110 or a frequency type. The observed service experience analytics may be calculated based on information provided by an NWDAF analytics consumer (e.g., a UE ID, a UE group ID, and/or the like) and information provided by the UPF (e.g., a QoS flow bit rate, a QoS flow packet delay, a packet transmission, a packet retransmission, and/or the like). In some implementations, the NWDAF may calculate user data congestion analytics based on the PCF data. The user data congestion analytics may include data congestion related analytics of another NF over a period of time, may be associated with a specific area, a specific UE, and/or the like, and may include control plane traffic, user plane traffic, or both. The user data congestion analytics may be calculated based on information provided by an NWDAF analytics consumer (e.g., a UE ID, a UE group ID, and/or the like) and information provided by the UPF (e.g., an application ID, a packet filter set, a measurement period, uplink and downlink throughput, a timestamp, an achieved sampling ratio, and/or the like).

In some implementations, the NWDAF may calculate slice instance loading analytics based on the PCF data. The slice instance loading analytics may include slice load level information on a network slice level or a network slice instance level or both over a period of time. The slice instance loading analytics may be provided to an NWDAF analytics subscriber and, for the network slice/network slice instance, may include information identifying a quantity of UE registrations, a quantity of established PDU sessions, a resource usage in NF, a resource usage threshold crossing, and/or the like. In some implementations, the NWDAF may calculate network performance analytics based on the PCF data. The network performance analytics may include RAN 110 status information, RAN 110 resource usage, communication performance, mobility performance, and a quantity of UEs in the RAN 110 over a period of time. The network performance analytics may be provided to an NWDAF analytics subscriber and may include an analytics time period subset, an average number of UEs, an average ratio of successful PDU session setup and handover, an average RAN 110 usage, a status of the RAN 110, and/or the like.

In some implementations, the NWDAF may calculate wireless local area network (WLAN) performance analytics based on the PCF data. The WLAN performance analytics may include a quality and a performance of a WLAN connection of the UE 105 based on a location of the UE 105 over a period of time. The WLAN performance analytics may be calculated based on information provided by an NWDAF analytics consumer (e.g., a UE ID, a UE group ID, and/or the like) and information provided by the UPF (e.g., an uplink data rate, a downlink data rate, a traffic volume, and/or the like).

As shown at step 9 of FIG. 1B, the NWDAF may provide the analytics to the PCF. The PCF may receive the analytics from the NWDAF and may perform one or more actions based on the analytics. For example, the PCF may modify communications of the UE 105 based on the analytics, may identify and/or address an abnormal behavior of the UE 105 based on the analytics, may modify a service experience for the UE 105 based on the analytics, may address network congestion associated with the UE 105 based on the analytics, may adjust a load of a network slice utilized by the UE 105 based on the analytics, may modify network performance for the UE 105 based on the analytics, may modify WLAN performance for the UE 105 based on the analytics, and/or the like.

As shown at step 10 of FIG. 1B, a consumer NF (e.g., the SMF, the AMF, the NEF, and/or the like) may retrieve the PCF registration data from the serving UDM device. The PCF registration data may include data identifying the PCF associated with the UE 105. For example, the consumer NF may provide, to the UDM device, a request for the PCF registration data for the UE 105. The consumer NF may be modified to retrieve, from the UDM device, the PCF registration data associated with the UE 105. The consumer NF may receive, from the UDM device, the PCF registration data associated with the UE 105 based on the request for the PCF registration data. For example, the UDM device may provide, based on the request and to the consumer NF, the PCF registration data associated with the UE 105. As shown at step 11, the consumer NF may retrieve PCF data from the PCF associated with the UE 105. For example, the consumer NF may provide, to the PCF, a request for the PCF data. The consumer NF may receive, from the PCF, the PCF data associated with the UE 105 based on the request for the PCF data. As shown at step 12, the consumer NF may perform one or more actions based on the PCF data. For example, the consumer NF may modify session management for the UE 105 based on the PCF data, may modify access and mobility management for the UE 105 based on the PCF data, and/or the like.

As shown at step 1 of FIG. 1C, the PCF may establish an interface with the UDM device in order to communicate with the UDM device. For example, the interface may enable the PCF and the UDM device to communicate and to exchange information. As shown at step 2, the PCF may retrieve the serving UDM device of the UE 105 from the NRF. For example, the PCF may provide, to the NRF, a request for identification of the serving UDM device for the UE 105. The NRF may provide, to the PCF, the identification of the serving UDM device for the UE 105 based on the request. As shown at step 3, the PCF may utilize the interface to retrieve an identity of the NWDAF serving the UE 105 by using an identity of the UE 105 from the UDM-UE context management service. For example, the PCF may provide, to the UDM device, a request for the identity of the NWDAF serving the UE 105. The PCF may be modified to retrieve, from the UDM device, the identity of the NWDAF serving the UE 105. The PCF may receive, from the UDM device, the identity of the NWDAF serving the UE 105 based on the request for the identity of the NWDAF serving the UE 105. For example, the UDM device may provide, based on the request and to the PCF, the identity of the NWDAF serving the UE 105.

As shown at step 4 of FIG. 1C, the PCF may retrieve analytics from the NWDAF serving the UE 105. For example, the PCF may provide, to the NWDAF, a request for the analytics. The PCF may receive, from the NWDAF, the analytics based on the request for the analytics. In some implementations, the analytics may include one or more of the analytics described above in connection with step 8 of FIG. 1B. As shown at step 5 of FIG. 1C, the PCF may perform one or more actions based on the analytics. For example, the PCF may modify communications of the UE 105 based on the analytics, may identify and/or address an abnormal behavior of the UE 105 based on the analytics, may modify a service experience for the UE 105 based on the analytics, may address network congestion associated with the UE 105 based on the analytics, may adjust a load of a network slice utilized by the UE 105 based on the analytics, may modify network performance for the UE 105 based on the analytics, may modify WLAN performance for the UE 105 based on the analytics, and/or the like.

As shown at step 6 of FIG. 1C, the PCF may utilize the interface to retrieve identities of other network functions (e.g., the SMF, the AMF, the NEF, and/or the like) serving the UE 105 by using an identity of the UE 105 from the UDM-UE context management service. For example, the PCF may provide, to the UDM device, a request for the identities of the other network functions serving the UE 105. The PCF may be modified to retrieve, from the UDM device, the identities of the other network functions serving the UE 105. The PCF may receive, from the UDM device, the identities of the other network functions serving the UE 105 based on the request for the identities of the other network functions serving the UE 105. For example, the UDM device may provide, based on the request and to the PCF, the identities of the other network functions serving the UE 105.

As shown at step 7 of FIG. 1C, the PCF may retrieve data from the other network functions serving the UE 105. For example, the PCF may provide, to the other network functions, a request for the data. The PCF may receive, from the other network functions, the data based on the request for the data. As shown at step 8 of FIG. 1C, the PCF may perform one or more actions based on the data. For example, the PCF may modify session management for the UE 105 based on the data, may modify access and mobility management for the UE 105 based on the data, and/or the like.

Implementations described herein may provide close loop control over a user experience for a UE 105, may reduce or eliminate an additional network hop which may provide lower latency, may provide flexibility to orchestrate policies on the PCF, may address future roaming use cases, and/or the like.

In this way, the network device (e.g., a PCF) provides analytics from an NWDAF based on network policies. For example, the network device may be provided with a new interface for communication between the network device and a UDM. The network device may receive an identity of the UDM from an NRF, and may utilize the new interface to retrieve an identity of an NWDAF associated with a UE using a UE identity from a UDM-UE context management service. The network device may utilize the new interface to provide a PCF-to-UE context association to the UDM and to register with UDM after a successful SM/UE/AM policy association. The UDM may support an additional registration data set in the UE context management service to accommodate PCF registration data identifying the PCF associated with the UE, and the NWDAF may retrieve the PCF registration data from UDM in order to identify the PCF serving the UE. Thus, the network device may conserve computing resources, networking resources, and/or other resources that would have otherwise been consumed by failing to identify a PCF supporting a specific UE, failing to provide analytics associated with the PCF and a specific UE to the PCF, failing to utilize the analytics associated with the PCF and the specific UE, failing to perform actions based on the analytics associated with the PCF and the specific UE, and/or the like.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
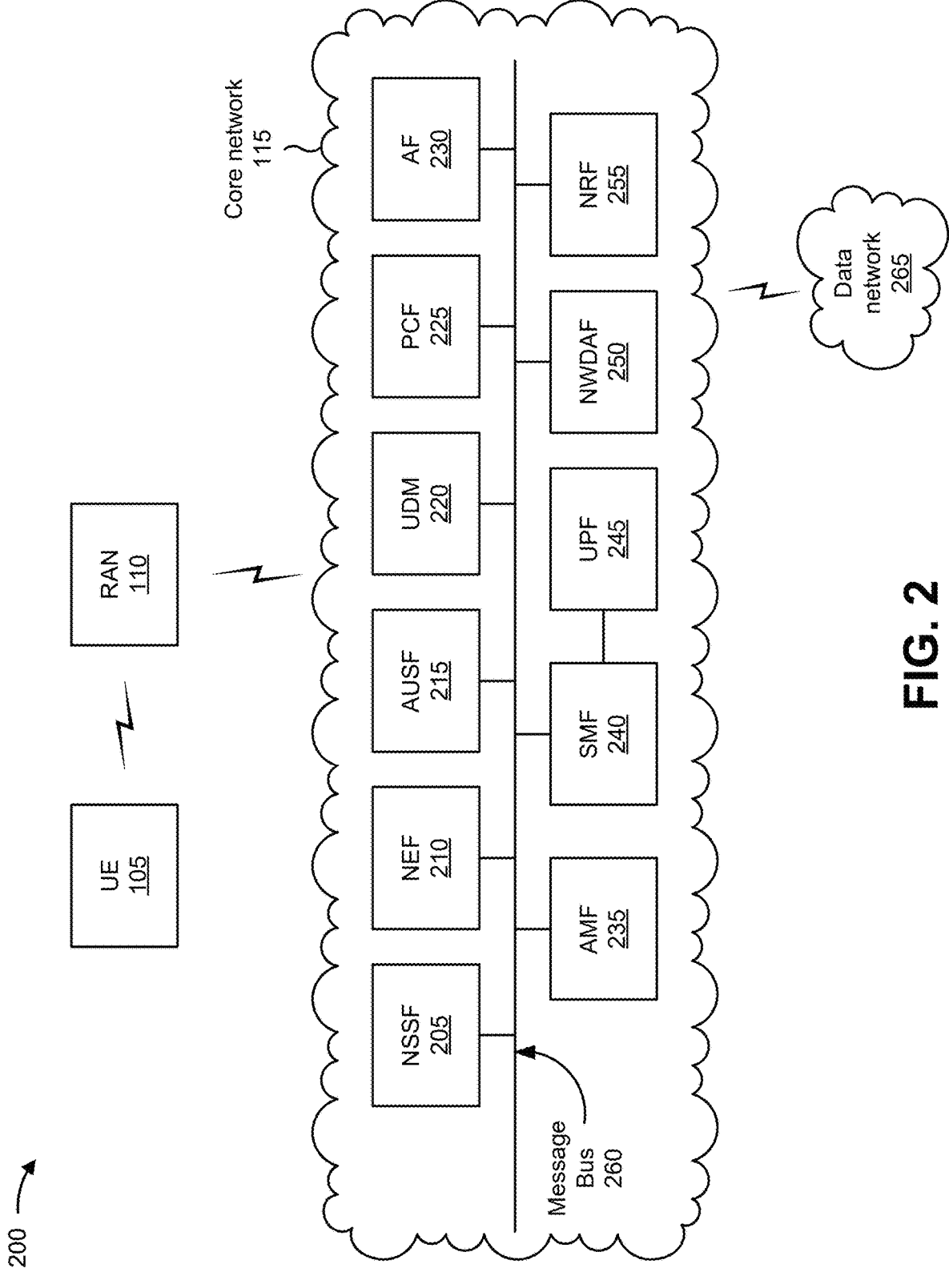
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, and a data network 265. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, an NEF 210, an authentication server function (AUSF) 215, a UDM device 220, a PCF 225, an application function (AF) 230, an AMF 235, an SMF 240, a UPF 245, an NWDAF 250, and/or an NRF 255. These functional elements may be communicatively connected via a message bus 260. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM device 220 includes one or more devices that store user data and profiles in the wireless telecommunications system. The UDM device 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment Internet protocol (IP) address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane QoS, among other examples.

The NWDAF 250 includes one or more devices that collect data from UEs, network functions, operations, administration, and maintenance (OAM) systems, and/or the like from the core network 115, a cloud computing environment, edge networks, and/or the like, and that utilize the data for analytics.

The NRF 255 includes one or more devices that provide an index that can be consulted by other NFs, so that the other NFs may discover information regarding other entities present in the core network 115, as well as service capabilities that may be required.

The message bus 260 represents a communication structure for communication among the functional elements. In other words, the message bus 260 may permit communication between two or more functional elements.

The data network 265 includes one or more wired and/or wireless data networks. For example, the data network 265 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
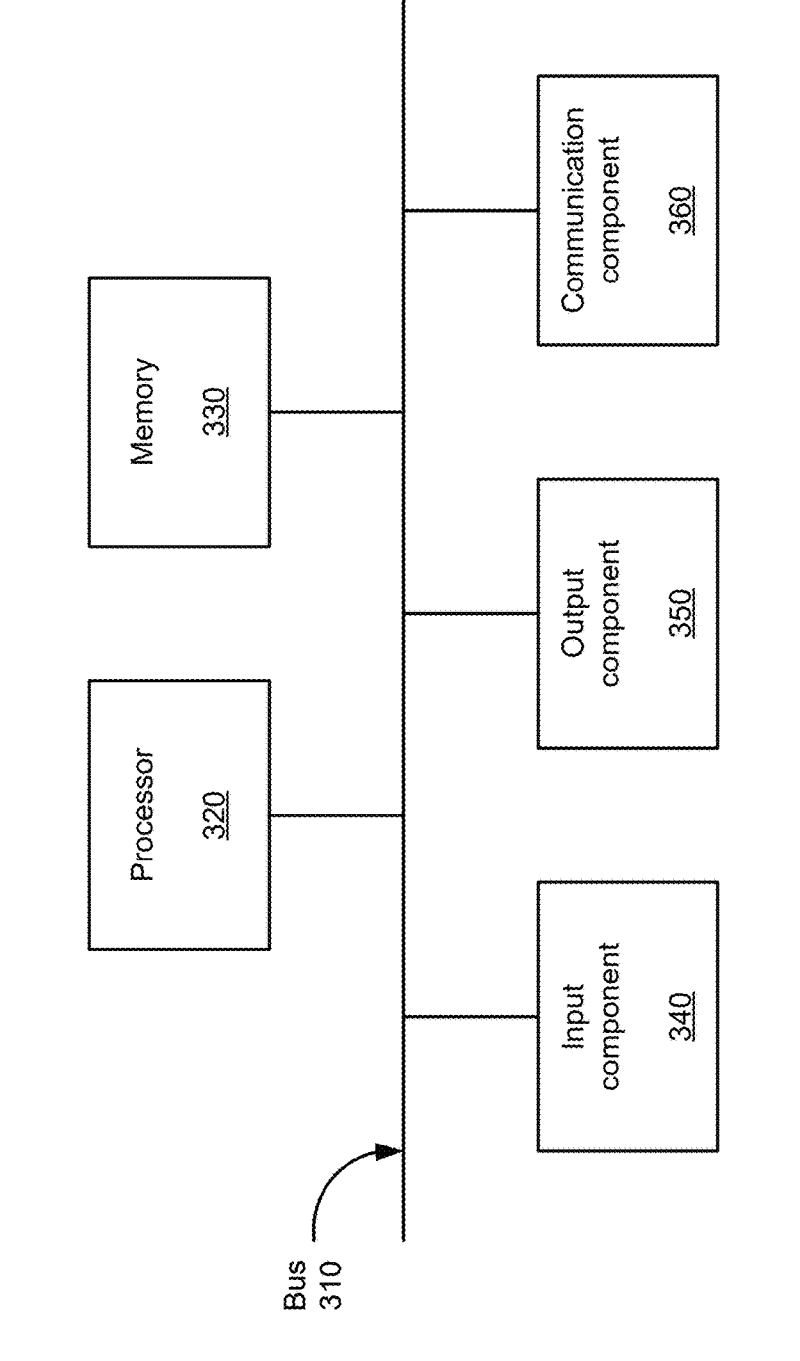
FIG. 3 is a diagram of example components of one or more devices of FIG. 2.

FIG. 3 is a diagram of example components of a device 300, which may correspond to the UE 105, the RAN 110, the NSSF 205, the NEF 210, the AUSF 215, the UDM device 220, the PCF 225, the AF 230, the AMF 235, the SMF 240, the UPF 245, the NWDAF 250, and/or the NRF 255. In some implementations, the UE 105, the RAN 110, the NSSF 205, the NEF 210, the AUSF 215, the UDM device 220, the PCF 225, the AF 230, the AMF 235, the SMF 240, the UPF 245, the NWDAF 250, and/or the NRF 255 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for providing analytics from an NWDAF based on network policies. In some implementations, one or more process blocks of FIG. 4 may be performed by a network device (e.g., the PCF 225). In some implementations, one or more process blocks of FIG. 4 may be performed by another device or a group of devices separate from or including the network device, such as a RAN (e.g., the RAN 110), an NWDAF (e.g., the NWDAF 250), and/or an NRF (e.g., the NRF 255). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include establishing an interface with a UDM device (block 410). For example, the network device may establish an interface with a UDM device, as described above. In some implementations, the network device is a PCF.

As further shown in FIG. 4, process 400 may include utilizing the interface to register with the UDM device and to provide, to the UDM device, registration data identifying an association between the network device and a UE (block 420). For example, the network device may utilize the interface to register with the UDM device and to provide, to the UDM device, registration data identifying an association between the network device and a UE, as described above.

As further shown in FIG. 4, process 400 may include providing policy data to an NWDAF that identifies the network device based on the registration data (block 430). For example, the network device may provide policy data to an NWDAF that identifies the network device based on the registration data, as described above. In some implementations, the network device, the NWDAF, and the UDM device are part of a core network.

As further shown in FIG. 4, process 400 may include receiving, from the NWDAF, analytics calculated based on the policy data (block 440). For example, the network device may receive, from the NWDAF, analytics calculated based on the policy data, as described above. In some implementations, the NWDAF is configured to receive, from a network repository function, an identity of the UDM device serving the UE and to identify the network device based retrieving the registration data from the UDM device.

In some implementations, process 400 includes performing one or more actions based on the analytics. In some implementations, performing the one or more actions includes one or more of modifying communications of the UE based on the analytics, identifying an abnormal behavior of the UE based on the analytics, or modifying a service experience for the UE based on the analytics. In some implementations, performing the one or more actions includes one or more of addressing network congestion associated with the UE based on the analytics, adjusting a load of a network slice utilized by the UE based on the analytics, modifying network performance for the UE based on the analytics, or modifying LAN performance for the UE based on the analytics.

In some implementations, process 400 includes retrieving an identity of the UDM device serving the UE from an NRF, utilizing the interface to retrieve, from the UDM device, an identity of the network data analytics function serving the UE, retrieving additional analytics from the NWDAF, and performing one or more additional actions based on the additional analytics. In some implementations, performing the one or more additional actions includes one or more of modifying communications of the UE based on the additional analytics, identifying an abnormal behavior of the UE based on the additional analytics, or modifying a service experience for the UE based on the additional analytics. In some implementations, performing the one or more additional actions includes one or more of addressing network congestion associated with the UE based on the additional analytics, adjusting a load of a network slice utilized by the UE based on the additional analytics, modifying network performance for the UE based on the additional analytics, or modifying LAN performance for the UE based on the additional analytics.

In some implementations, process 400 includes utilizing the interface to retrieve, from the UDM device, an identity of a network function serving the UE, retrieving data from the network function, and performing one or more additional actions based on the data. In some implementations, the network function includes one or more of an AMF, an SMF, or an NEF. In some implementations, the identity of the network function serving the UE is generated by a context management service provided by the UDM device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
establishing, by a policy control function (PCF), an interface with a unified data management (UDM) device;
utilizing, by the PCF, the interface to register with the UDM device and to provide, to the UDM device, registration data identifying an association between the PCF and a user equipment (UE), wherein the registration data indicates the PCF is serving the UE;
receiving, by the PCF and from a network data analytics function (NWDAF) serving the UE, a request for policy data,
wherein the NWDAF, prior to the request for the policy data, identifies the PCF based on receiving an identity of the UDM device from a network repository function (NRF) and retrieving the registration data from the UDM device;
providing, by the PCF, in response to the request for the policy data, the policy data to the NWDAF; and
receiving, by the PCF and from the NWDAF, analytics calculated based on the policy data.

2. The method of claim 1, further comprising:
performing one or more actions based on the analytics.

3. The method of claim 2,
wherein performing the one or more actions comprises one or more of:
modifying communications of the UE based on the analytics;
identifying an abnormal behavior of the UE based on the analytics; or
modifying a service experience for the UE based on the analytics.

4. The method of claim 2,
wherein performing the one or more actions comprises one or more of:
addressing network congestion associated with the UE based on the analytics;

adjusting a load of a network slice utilized by the UE based on the analytics;
modifying network performance for the UE based on the analytics; or
modifying local area network performance for the UE based on the analytics.

5. The method of claim 1,
wherein the PCF, the NWDAF, and the UDM device are part of a core network.

6. The method of claim 1, further comprising:
retrieving an identity of the UDM device from the NRF;
utilizing the interface to retrieve, from the UDM device, an identity of the NWDAF;
retrieving additional analytics from the NWDAF; and
performing one or more actions based on the additional analytics.

7. A policy control function (PCF), comprising:
one or more processors configured to:
establish an interface with a unified data management (UDM) device;
utilize the interface to register with the UDM device and to provide, to the UDM device, registration data identifying an association between the PCF and a user equipment (UE), wherein the registration data indicates the PCF is serving the UE;
receive, from a network data analytics function (NWDAF) serving the UE, a request for policy data, wherein the NWDAF, prior to the request for the policy data, identifies the PCF based on receiving an identity of the UDM device from a network repository function (NRF) and retrieving the registration data from the UDM device;
provide, in response to the request for the policy data, the policy data to the NWDAF;
receive, from the NWDAF, analytics calculated based on the policy data; and
perform one or more actions based on the analytics.

8. The PCF of claim 7,
wherein the one or more processors are further configured to:
retrieve an identity of the UDM device serving the UE from the NRF;
utilize the interface to retrieve, from the UDM device, an identity of the NWDAF;
retrieve additional analytics from the NWDAF; and
perform one or more additional actions based on the additional analytics.

9. The PCF of claim 8,
wherein the one or more processors, to perform the one or more additional actions, are configured to one or more of:
modify communications of the UE based on the additional analytics;
identify an abnormal behavior of the UE based on the additional analytics; or
modify a service experience for the UE based on the additional analytics.

10. The PCF of claim 8,
wherein the one or more processors, to perform the one or more additional actions, are configured to one or more of:
address network congestion associated with the UE based on the additional analytics;
adjust a load of a network slice utilized by the UE based on the additional analytics;
modify network performance for the UE based on the additional analytics; or modify local area network performance for the UE based on the additional analytics.

11. The PCF of claim 7,
wherein the one or more processors are further configured to:
utilize the interface to retrieve, from the UDM device, an identity of a network function (NF) serving the UE;
retrieve data from the NF; and
perform one or more additional actions based on the data.

12. The PCF of claim 11,
wherein the NF includes one or more of an access and mobility management function, a session management function, or a network exposure function.

13. The PCF of claim 11,
wherein the identity of the NF serving the UE is generated by a context management service provided by the UDM device.

14. The PCF of claim 7,
wherein the PCF, the NWDAF, and the UDM device are part of a core network.

15. A non-transitory computer-readable medium storing a set of instructions, the set of instructions comprising:
one or more instructions that, when executed by one or more processors of a policy control function (PCF), cause the PCF to:
establish an interface with a unified data management (UDM) device;
utilize the interface to register with the UDM device and to provide, to the UDM device, registration data identifying an association between the PCF and a user equipment (UE), wherein the registration data indicates the PCF is serving the UE;
receive, from a network data analytics function (NWDAF) serving the UE, a request for policy data, wherein the PCF, the NWDAF, and the UDM device are part of a core network, and
wherein the NWDAF, prior to the request for the policy data, identifies the PCF based on receiving an identity of the UDM device from a network repository function (NRF) and retrieving the registration data from the UDM device;
provide, in response to the request for the policy data, the policy data to the NWDAF;
receive, from the NWDAF, analytics calculated based on the policy data; and
perform one or more actions based on the analytics.

16. The non-transitory computer-readable medium of claim 15,
wherein the one or more instructions, that cause the PCF to perform the one or more actions, cause the PCF to one or more of:
modify communications of the UE based on the analytics;
identify an abnormal behavior of the UE based on the analytics;

modify a service experience for the UE based on the analytics;
address network congestion associated with the UE based on the analytics;
adjust a load of a network slice utilized by the UE based on the analytics;
modify network performance for the UE based on the analytics; or
modify local area network performance for the UE based on the analytics.

17. The non-transitory computer-readable medium of claim 15,
wherein the one or more instructions further cause the PCF to:
retrieve an identity of the UDM device serving the UE from the NRF;
utilize the interface to retrieve, from the UDM device, an identity of the NWDAF;
retrieve additional analytics from the NWDAF; and
perform one or more additional actions based on the additional analytics.

18. The non-transitory computer-readable medium of claim 17,
wherein the one or more instructions, that cause the PCF to perform the one or more additional actions, cause the PCF to one or more of:
modify communications of the UE based on the additional analytics;
identify an abnormal behavior of the UE based on the additional analytics;
modify a service experience for the UE based on the additional analytics;
address network congestion associated with the UE based on the additional analytics;
adjust a load of a network slice utilized by the UE based on the additional analytics;
modify network performance for the UE based on the additional analytics; or
modify local area network performance for the UE based on the additional analytics.

19. The non-transitory computer-readable medium of claim 15,
wherein the one or more instructions further cause the PCF to:
utilize the interface to retrieve, from the UDM device, an identity of a network function (NF) serving the UE;
retrieving data from the NF; and
perform one or more additional actions based on the data.

20. The non-transitory computer-readable medium of claim 19,
wherein the NF includes one or more of an access and mobility management function, a session management function, or a network exposure function.

* * * * *